(12) United States Patent
Jeon

(10) Patent No.: US 12,084,263 B2
(45) Date of Patent: Sep. 10, 2024

(54) PRETREATMENT CONTAINER FOR DISCHARGING OF SECONDARY BATTERY

(71) Applicant: SK INNOVATION CO., LTD., Seoul (KR)

(72) Inventor: Soo Yong Jeon, Daejeon (KR)

(73) Assignee: SK ON CO., LTD., Seoul (KR)

( * ) Notice: Subject to any disclaimer, the term of this patent is extended or adjusted under 35 U.S.C. 154(b) by 563 days.

(21) Appl. No.: 17/369,661

(22) Filed: Jul. 7, 2021

(65) Prior Publication Data

US 2022/0017291 A1    Jan. 20, 2022

(30) Foreign Application Priority Data

Jul. 17, 2020    (KR) .......................... 10-2020-0088972

(51) Int. Cl.
| | | |
|---|---|---|
| *H01M 10/54* | (2006.01) | |
| *B65D 85/68* | (2006.01) | |
| *B65D 88/02* | (2006.01) | |
| *B65D 90/00* | (2006.01) | |
| *H01M 10/44* | (2006.01) | |

(52) U.S. Cl.
CPC ............. *B65D 85/68* (2013.01); *B65D 88/02* (2013.01); *B65D 90/0086* (2013.01); *H01M 10/44* (2013.01); *H01M 10/54* (2013.01); *B65D 2585/88* (2013.01); *Y02W 30/84* (2015.05)

(58) Field of Classification Search
CPC ..................................................... H01M 10/44
See application file for complete search history.

(56) References Cited

U.S. PATENT DOCUMENTS

| | | | |
|---|---|---|---|
| 2014/0352199 A1* | 12/2014 | Matney | ................ A01M 23/04 43/61 |
| 2021/0394930 A1* | 12/2021 | O'Toole | .................... B64D 1/12 |

FOREIGN PATENT DOCUMENTS

| | | |
|---|---|---|
| JP | 3625638 B2 | 3/2005 |
| KR | 201999000711 U | 1/1991 |
| KR | 10-2006-0027091 A | 3/2006 |

\* cited by examiner

*Primary Examiner* — Robert Grant
(74) *Attorney, Agent, or Firm* — IP & T GROUP LLP

(57) ABSTRACT

Provided is a pretreatment container for discharging of a secondary battery used in the process of processing discharging of a secondary battery, in which a first upper plate and a second upper plate are rotatably disposed in a staggered manner on an upper side of a housing including a receiving space receiving a waste battery, thereby preventing the waste battery from floating during the discharging process.

6 Claims, 5 Drawing Sheets

PRETREATMENT CONTAINER FOR DISCHARGING OF SECONDARY BATTERY

CROSS-REFERENCE TO RELATED APPLICATIONS

This application claims priority under 35 U.S.C. § 119 to Korean Patent Application No. 10-2020-0088972, filed on Jul. 17, 2020, in the Korean Intellectual Property Office, the disclosure of which is incorporated herein by reference in its entirety.

TECHNICAL FIELD

The following disclosure relates to a treatment container used in a recycling operation of a secondary battery, and in particular, to a pretreatment container for discharging of a secondary battery used in a secondary battery discharge treatment process.

BACKGROUND

In general, lithium-ion secondary batteries, which can be configured to be light-weight, as well as having a high operating voltage and a high energy density, have been commonly used as a power source of small portable equipment, and in a large device, a plurality of lithium ion secondary batteries are used in the form of a module.

However, since lithium ion secondary batteries should be discarded when reaching the end of their life span after a certain period of use, the amount of discarded batteries has also increased along with an increase in the amount of use of the lithium ion secondary batteries. Thus, research has been actively conducted to reduce the amount of waste and increase economic efficiency by recovering and recycling rare metals such as lithium ions from the discarded secondary batteries.

Prior to a recycling operation of the lithium ion secondary battery, a discharge treatment process is performed to remove a residual capacity of the secondary battery, and the discharge treatment process includes a cutting operation S10 of cutting a secondary battery, an immersion operation S20 of immersing the secondary battery in a solution, and a discharge operation S30 of discharging the immersed secondary battery, as shown in FIG. 1. Meanwhile, some of the immersed batteries may float in a state of not being completely discharged, and if the secondary battery floating in the state of not being completely discharged reacts with the atmosphere, a fire may occur.

Therefore, there is a need for a technical means capable of preventing the secondary battery from floating to come into contact with the atmosphere in the discharge treatment process.

SUMMARY

An exemplary embodiment of the present invention is directed to providing a pretreatment container capable of solving a problem in which a secondary battery floats in the process of immersing the secondary battery in a solution to discharge the secondary battery.

Another exemplary embodiment of the present invention is directed to providing a pretreatment container capable of preventing a waste battery, which is not completely discharged, from coming into contact with the atmosphere to cause a fire by limiting the secondary battery from floating in an immersing process.

In one general aspect, a pretreatment container for discharging of a secondary battery includes: a housing 100 having an open upper side and including a receiving space 110 receiving a waste battery; an upper plate 200 including a first upper plate 200A and a second upper plate 200B located on an upper side of the housing 100 and disposed in a staggered manner; and a door 300 provided on one side of the housing and opened and closed.

Coupling surfaces of the first upper plate 200A and the second upper plate 200B coupled to the housing 100 may be disposed to face each other.

A length L1 of the first upper plate 200A may be greater than a length L2 of the second upper plate 200B, and an inclination angle A1 of the first upper plate 200A may be smaller than an inclination angle A2 of the second upper plate 200B.

The lengths of the first upper plate 200A and the second upper plate 200B may be determined by Equation 1 below.

$$L1 \cos A1 + L2 \cos A2 > L3 \qquad \text{Equation 1}$$

wherein L1 is the length of the first upper plate, L2 is the length of the second upper plate, L3 is the length of the receiving space of the opened housing in the width direction, A1 is the inclination angle of the first upper plate, and A2 is the inclination angle of the second upper plate.

The first upper plate 200A and the second upper plate 200B may be rotatably hinged to the housing 100, and the housing 100 may include a restraining portion 130 protruding from an inner surface below a coupling portion at which the first upper plate 200A and the second upper plate 200B are hinged to the housing.

An insertion portion 210 through which the waste battery is inserted into the receiving space 110 of the housing 100 may be defined between a free end of the first upper plate 200A and a free end of the second upper plate 200B which are disposed in a staggered manner.

The housing 100 may include a plurality of holes 140 allowing the receiving space 110 to communicate with the outside.

Other features and aspects will be apparent from the following detailed description, the drawings, and the claims.

DETAILED DESCRIPTION OF EXEMPLARY EMBODIMENTS

Figure 1:
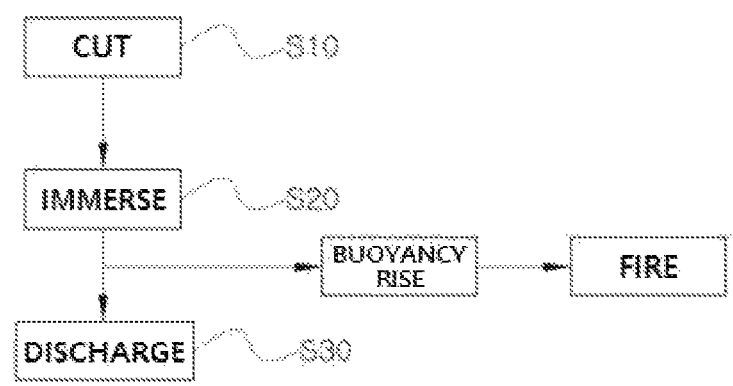
FIG. 1 is a flowchart illustrating a process of discharging a waste battery and a process in which a fire occurs.

Advantages and features of the invention and methods to achieve the same are described more fully hereinafter with reference to the accompanying drawings in which embodiments are shown. This invention may, however, be embodied in many different forms and should not be construed as limited to the embodiments set forth herein. Rather, these embodiments are provided so that this disclosure is thorough, and will fully convey the scope of the invention to those skilled in the art and this invention is defined by the scope of the claims. Like reference numerals refer to like elements throughout the present specification.

In the following description, if a detailed description of the relevant known functions or configurations is determined to unnecessarily obscure the gist of the present disclosure, the detailed description will be omitted. The terms used henceforth are defined in consideration of the functions of the disclosure and may be altered according to the intent of a user or operator, or conventional practice. Therefore, the terms should be defined on the basis of the entire content of this disclosure.

Hereinafter, a pretreatment container 1000 for discharging of a secondary battery according to the present invention will be described with reference to the accompanying drawings.

First Exemplary Embodiment

Figure 2:
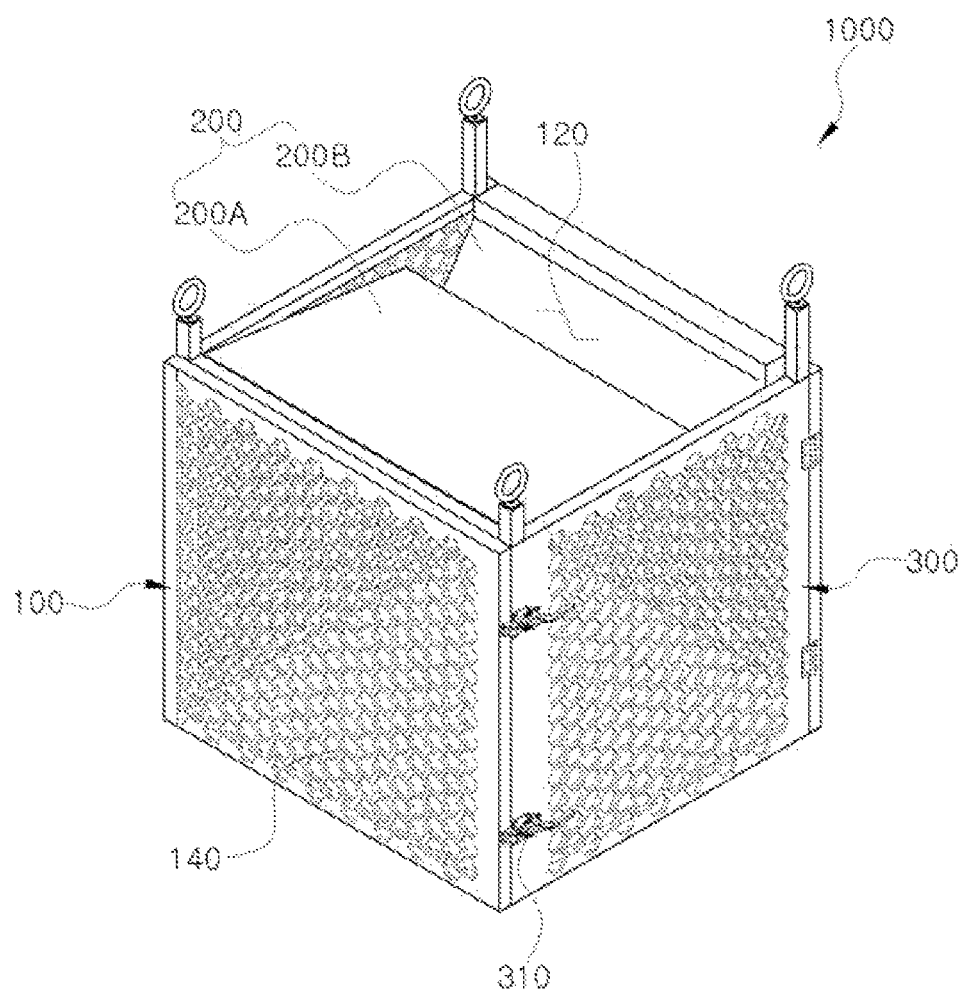
FIG. 2 is a perspective view of a pretreatment container for discharging of a secondary battery according to a first exemplary embodiment of the present invention.
Figure 3A:
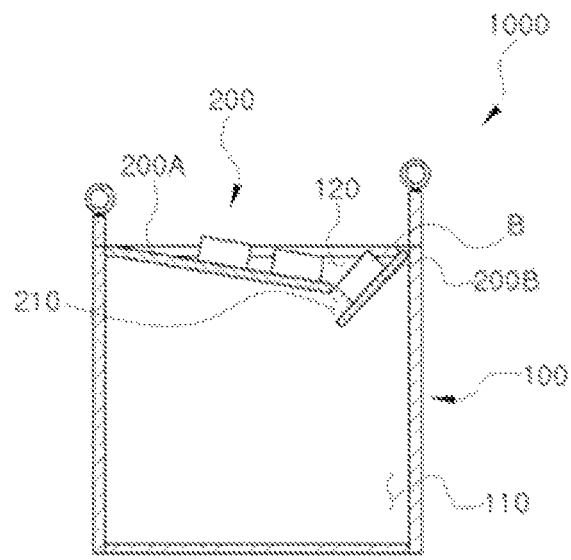
FIG. 3A is a conceptual diagram illustrating a discharging process using a pretreatment container for discharging of a secondary battery according to the first exemplary embodiment of the present invention.
Figure 3B:
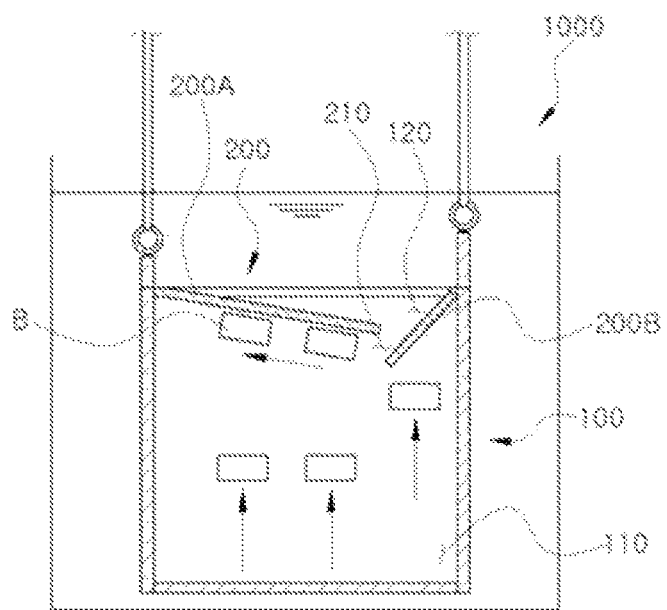
FIG. 3B is a conceptual diagram illustrating a discharging process using a pretreatment container for discharging a secondary battery according to the first exemplary embodiment of the present invention.
Figure 4:
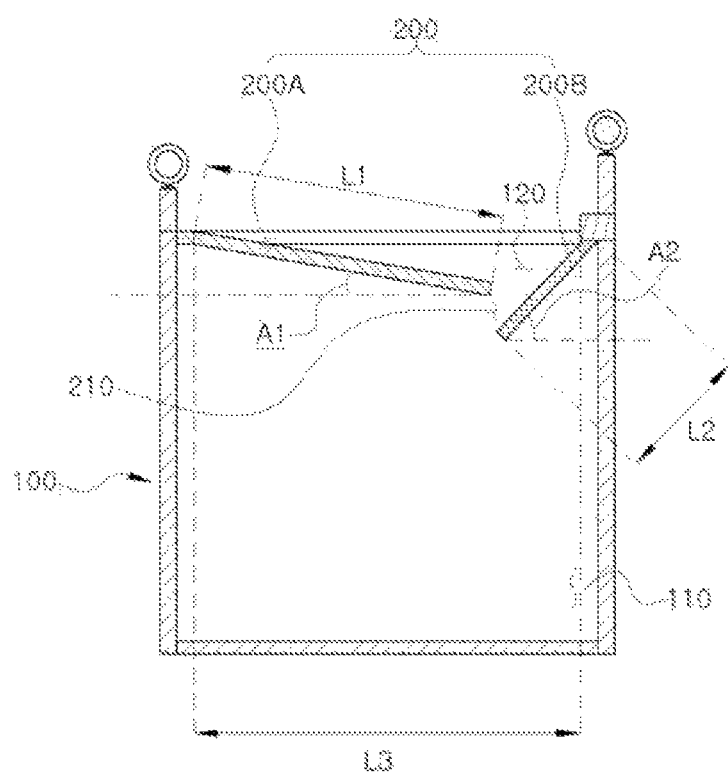
FIG. 4 is a cross-sectional view of a pretreatment container for discharging of a secondary battery according to the first exemplary embodiment of the present invention.

FIG. 2 is a perspective view of a pretreatment container 1000 for discharging of a secondary battery according to a first exemplary embodiment of the present invention, FIG. 3 is a conceptual diagram illustrating a discharging process using the pretreatment container 1000 according to the first exemplary embodiment, and FIG. 4 is a cross-sectional view illustrating the pretreatment container 1000 according to the first exemplary embodiment.

Referring to FIGS. 2, 3A, and 3B, a pouch-type secondary battery according to the first exemplary embodiment may include a housing 100 having a receiving space in which a waste battery is located and having an open portion 120 in which the receiving space and the outside communicate with each other, an upper plate 200 located on the open portion 120, forming an insertion portion through which the waste battery is inserted into the receiving space, and having an inclination structure in which one end in a length direction is located below a coupling portion coupled to the housing 100, and a door 300 provided on a side surface of the housing and able to be opened and closed. That is, an insertion portion 210 through which a waste battery B is inserted into a receiving space 110 of the housing 100 is provided between a free end of a first upper plate 200A and a free end of a second upper plate 200B which are disposed in a staggered manner.

In detail, a process of discharging the waste battery includes cutting the waste battery in a battery cutting operation S10, putting the cut battery into a solution for discharging the battery in an immersing operation S20, and discharging the battery for a designated certain period of time in the discharging operation S30. Here, since there is a problem in which the waste battery floats and a fire occurs in the discharging operation S30, in the present invention, the waste battery B is put into the pretreatment container 1000 as shown in FIG. 3A, and the waste battery B is then discharged in a state in which the waste battery B is inserted in the pretreatment container 1000 as shown in FIG. 3B to prevent the waste battery B from floating in a state in which the waste battery B is not completely discharged to contact air. Here, the open portion 120 represents an upper surface of the receiving space 110 in communication with the outside, and hereinafter, a length of the upper surface of the receiving space 110 in communication with the outside in a width direction is defined as an open portion length.

In addition, in order to facilitate the insertion of the waste battery B into the receiving space 110 through the insertion portion 210 and prevent the waste battery B from escaping through the insertion portion 210 and floating, the upper plate 200 may include a first upper plate 200A located on one side and a second upper plate 200B disposed on the other side to face the first upper plate 200A, and the insertion portion 210 may be formed between the first upper plate 200A and the second upper plate 200B, as shown in FIG. 4. In detail, when the waste battery B is inserted into the receiving space 110 on land, as shown in FIG. 3A, the waste battery B moves on inclined surfaces of the first upper plate 200A and the second upper plate 200B and is naturally inserted into the receiving space 110 through the insertion portion 210, and when the pretreatment container is immersed in a solution used for discharging, as shown in FIG. 3B, the floating waste battery B moves to the edge along the inclined surfaces of the first upper plate 200A and the second upper plate 200B as shown in FIG. 3B, whereby the waste battery B is limited from floating.

In addition, as shown in FIG. 4, it is recommended that an inclination angle A2 of the second upper plate 200B should be greater than an inclination angle A1 of the first upper plate 200A and a length L1 of the first upper plate 200A should be greater than a length L2 of the second upper plate 200B. In detail, the first upper plate 200A and the second upper plate 200B have different inclinations and the upper plate having a smaller inclination is formed to be longer, thereby maximizing a volume of the receiving space 110 for receiving the waste battery B. In addition, it is recommended that the sum of the length L1 of the first upper plate 200A and the length L2 of the second upper plate 200B should be greater than a length L3 of the open portion. In detail, the first upper plate 200A and the second upper plate 200B have a downwardly inclined shape, and the insertion portion 210 is disposed between the first upper plate 200A and the second upper plate 200B. Here, if the sum of the lengths of the first upper plate 200A and the second upper plate 200B is less than the length of the open portion 120, an area of the insertion portion 210 may be larger than necessary, and thus, the area of the insertion portion 210 is adjusted by making the sum of the lengths of the first upper plate 200A and the second upper plate 200B greater than the length of the open portion 120.

In addition, since the first upper plate 200A and the second upper plate 200B are arranged to be inclined, the length is determined by Equation 1 below and the first upper plate 200A and the second upper plate 200B may be arranged to cross each other.

$$L1 \cos A1 + L2 \cos A2 > L3 \qquad \text{Equation 1}$$

Here, L1 is the length of the first upper plate, L2 is the length of the second upper plate, L3 is the length of the receiving space of the opened housing in the width direction, A1 is the inclination angle of the first upper plate, and A2 is the inclination angle of the second upper plate.

In addition, it is recommended that any one of the first upper plate 200A and the second upper plate 200B should be formed to be longer than the other plate so that the insertion portion 210 is located to be lopsided to the edge, rather than being located at the center of the housing 100. In an exemplary embodiment, as shown in FIG. 4, the first upper plate 200A having a smaller inclination angle is formed to be longer than the second upper plate 200B, thereby minimizing the number of waste batteries moving to the insertion portion 210 when the waste batteries located in the receiving space 110 float.

Second Exemplary Embodiment

Figure 5:
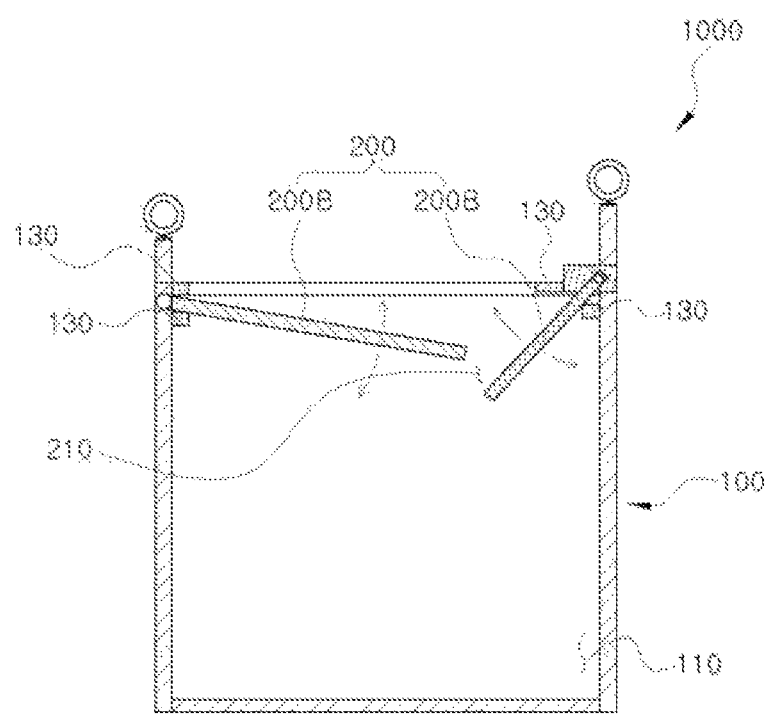
FIG. 5 is a cross-sectional view of a pretreatment container for discharging of a secondary battery according to a second exemplary embodiment of the present invention.

FIG. 5 illustrates a pretreatment container 1000 for discharging of a secondary battery according to a second exemplary embodiment.

Referring to FIG. 5, the first upper plate 200A and the second upper plate 200B are hinged to the housing 100, and a restraining portion 130 limiting a radius of a hinge motion of the first upper plate 200A and the second upper plate 200B may be provided in the housing 100. In detail, the insertion portion 210 is an entrance through which the waste battery is injected into the receiving space 110, and as the area is larger, it may be easier to inject the waste battery into the receiving space 110, and as the area is narrower, it may be more difficult for the waste battery to float when the pretreatment container is inserted into a solution to escape through the insertion portion 210. Thus, the upper plate 200 is hinged to the housing 100 and a radius of rotation of the upper plate 200 is limited by the restraining portion 130, whereby when the waste battery is inserted into the receiving space 110 on land, the area of the insertion portion 210 is maintained to be large, and when the pretreatment container is put into a solution, the area of the insertion portion 210 is narrowed.

In other words, the first upper plate 200A and the second upper plate 200B are hinged to the housing 100, so that when the pretreatment container is located on land, the first upper plate 200A and the second upper plate 200B rotate downward by a dead weight so the area of the insertion portion 210 is increased, and when the pretreatment container is inserted into a solution used for discharging, the upper plate is rotated upward by a force of pushing the upper plate as the waste battery floats or a buoyancy force, thus minimizing the area of the insertion portion 210.

In addition, in the case of the structure in which the upper plate 200 is hinged to the housing 100 so that the upper plate 200 is rotatable at 360 degrees, the upper plate 200 may be drooped downward by a dead weight to excessively increase the area of the insertion portion 210 and the floating waste battery cannot push the upper plate 200 up so the floating of the waste battery cannot be limited by the upper plate 200. Therefore, a radius of rotation of the upper plate 200 is constantly limited using the restraining portion 130, so that a hinge motion of the upper plate 200 is performed such that the waste battery is easily inserted through the insertion portion 210 but is difficult to discharge.

Here, the restraining portion 130 is located on a lower inner circumferential surface of a coupling portion at which the first upper plate 200A and the second upper plate 200B are coupled to the housing 100, and protrudes inwardly to limit the radius of rotation of the first upper plate 200A and the second upper plate 200B, and the radius of rotation may be adjusted according to a protruding length of the restraining portion 130.

In addition, in the present invention, as shown in FIG. 2, it is recommended that the pretreatment container 1000 for discharging of a secondary battery should have a structure in which a plurality of holes 140 are provided on a surface thereof and allow the outside and the receiving space to communicate with each other, so that when the pretreatment container 1000 is inserted into a solution used for discharge, the solution used for discharge may be rapidly injected into the pretreatment container 1000 through the holes 140. In addition, the door 300 may be hinged to the housing 100 and have an opening/closing handle 310, so that, after discharging the waste battery, the door 300 may be used as a passage for a user to open through the opening/closing handle 310 to easily take out the discharged waste battery located in the receiving space.

Through the solutions described above, the pretreatment container for discharging of a secondary battery of the present invention has an advantage in that, since the upper plate has a downwardly inclined structure, a waste battery may be easily injected through the insertion portion and may be difficult to discharge.

That is, since it is easy to inject the battery through the insertion portion, it is possible to quickly inject the waste battery into the receiving space, so that the process can be quickly performed, and since it is difficult to discharge the waste battery through the insertion portion, the problem in which the waste battery floats to be discharged through the insertion portion in the process of immersing the waste battery in a solution may be solved.

In addition, since the inclination angles of the two upper plates are different from each other, when the waste battery floats to push the plate up, any one plate pushes the other plate to close the insertion portion formed therebetween.

In addition, since the radius of a hinge motion of the upper plate can be adjusted, the waste battery may be easily injected and limited from being discharged by adjusting a formation position and area of the insertion portion.

The present invention should not be construed to being limited to the above-mentioned exemplary embodiment. The present invention may be applied to various fields and may be variously modified by those skilled in the art without departing from the scope of the present invention claimed in the claims. Therefore, it is obvious to those skilled in the art that these alterations and modifications fall in the scope of the present invention.

DETAILED DESCRIPTION OF MAIN ELEMENTS

1000: pretreatment container for discharging of secondary battery
100: housing
110: receiving space 120: open portion
130: restraining portion 140: hole
200: upper plate
200A: first upper plate 200B: second upper plate
210: insertion portion
300: door
310: opening/closing handle

What is claimed is:

1. A pretreatment container for discharging of a secondary battery, the pretreatment container comprising:
a housing having an open upper side and including a receiving space receiving a waste battery;
an upper plate including a first upper plate and a second upper plate located on an upper side of the housing and disposed in a staggered manner; and
a door provided on one side of the housing and able to be opened and closed,
wherein coupling surfaces of the first upper plate and the second upper plate coupled to the housing are disposed to face each other,
wherein a length L1 of the first upper plate is greater than a length L2 of the second upper plate, and an inclination angle A1 of the first upper plate is smaller than an inclination angle A2 of the second upper plate.

2. The pretreatment container of claim 1, wherein the lengths of the first upper plate and the second upper plate are determined by Equation 1 below $$L1 \cos A1 + L2 \cos A2 > L3 \qquad \text{Equation 1}$$

wherein L1 is the length of the first upper plate, L2 is the length of the second upper plate, L3 is the length of the receiving space of the opened housing in the width direction, A1 is the inclination angle of the first upper plate, and A2 is the inclination angle of the second upper plate.

3. The pretreatment container of claim 1, wherein the first upper plate and the second upper plate are rotatably hinged to the housing, and
the housing includes a restraining portion protruding from an inner surface below a coupling portion at which the first upper plate and the second upper plate are hinged to the housing.

4. The pretreatment container of claim 2, wherein the first upper plate and the second upper plate are rotatably hinged to the housing, and
the housing includes a restraining portion protruding from an inner surface below a coupling portion at which the first upper plate and the second upper plate are hinged to the housing.

5. The pretreatment container of claim 3, wherein an insertion portion through which the waste battery is inserted into the receiving space of the housing is defined between a free end of the first upper plate and a free end of the second upper plate which are disposed in a staggered manner.

6. The pretreatment container of claim 1, wherein the housing includes a plurality of holes allowing the receiving space to communicate with the outside.

* * * * *